United States Patent Office 3,215,628
Patented Nov. 2, 1965

3,215,628
DRILLING FLUID
Dixon W. Peacock, Bartlesville, Okla., assignor to Phillips Petroleum Company, a corporation of Delaware
No Drawing. Filed Aug. 27, 1962, Ser. No. 219,770
12 Claims. (Cl. 252—8.5)

This invention relates to drilling fluids. In one aspect it relates to the preparation and use of drilling fluids such as aqueous and emulsion types of drilling fluids used in drilling deep wells, such as oil and gas wells. In another aspect it relates to drilling fluids such as aqueous and emulsion types of drilling fluids containing as an integral part of its composition a novel composition of matter. In still another aspect, the invention relates to a novel composition of matter which has particular utility as a drilling fluid additive and to a method for its preparation.

It is well known that in perforating the earthen formations to tap subterranean deposits such as gas or oil, that perforation is accomplished by well drilling tools and a drilling fluid. The drilling fluid serves to cool and lubricate the drill bits, to carry the cuttings to the surface as the drilling fluid is circulated in and out of the well, to support at least part of the weight of the drill pipe and drill bit, to provide a hydrostatic pressure head to prevent caving of the walls of the well bore, to deposit on the surface of the well bore a filter cake which acts as a thin, semi-impervious layer to prevent undue passage therethrough of fluids, and to perform other functions as are well known in the drilling art. It is important that the drilling fluid exhibit a relatively low rate of filtration or fluid loss in addition to having desirable rheological properties such as viscosity and gel strength. It is also important that the drilling fluid system should be kept as simple and inexpensive as possible in order to avoid undue expense in the drilling of the well.

Drilling fluid also has an effect on the friction between the drill pipe and the bore hole, and the higher the coefficient of friction between the drill pipe and the formation being driled, that is, the lower the degree of lubricity of the drilling fluid, the greater the power requirements needed to rotate the drill pipe in the bore hole filled with the drilling fluid. Further in this respect, a drilling fluid having a low degree of lubricity or a high coefficient of friction between the drill pipe and the uncased well bore means that a high degree of drag on the drill pipe results, thereby lessening the useful life of the drill pipe. Therefore the lubricating properties of the drilling fluid are assuming an increased importance to those skilled in the art, not only with regard to the wearing of the bearings in the drill bit, but also with respect to the friction between the drill pipe and the uncased bore hole.

It is therefore an object of this invention to provide a process for reducing the fluid loss, viscosity, and coefficient of friction properties of a drilling fluid. It is also an object of this invention to provide a novel composition of matter which is useful as a drilling mud additive. Still another object of the invention is to provide a method for controlling the fluid loss properties of a drilling fluid without adversely affecting the rheological properties of the drilling fluid. A further object of the invention is to provide a method, which is relatively simple and inexpensive, for preparing drilling mud additive compositions. Further objects and advantages of this invention will become apparent to those skilled in the art upon study of the disclosure of the invention including the detailed description of the invention.

Broadly, the invention contemplates a novel composition of matter prepared by sulfonating a blend of asphalt and the extract oil from the solvent extraction of a deasphalted, dewaxed oil remaining after removal of SAE–50 and lighter lubestock in the propane fractionation of a Mid-Continent lube oil stock, which composition of matter is particularly useful as a drilling mud additive for the purpose of improving the fluid loss, viscosity, and coefficient of friction characteristics of a drilling fluid. In one specific embodiment the invention contemplates the steps of, and the product obtained by, sulfonating a blend of a solid or semi-solid asphaltic material and the extract oil from the solvent extraction of a dewaxed, deasphalted oil remaining after removal of SAE–50 lubestock in the propane fractionation of a Mid-Continent lube oil stock with a sulfonating agent, neutralizing the sulfonic acid so produced with a basic compound, such as ammonium hydroxide or carbonate or an alkali metal or alkaline earth metal oxide, hydroxide or carbonate to produce a salt of the sulfonate of the blend of asphalt and extract oil and then adding the sulfonate so produced to a drilling fluid in an amount sufficient to improve the fluid loss, viscosity and coefficient of friction properties of the drilling fluid. The step of neutralizing the sulfonic acid can be omitted if desired when the composition is to be utilized in an aqueous, alkaline drilling fluid because the sulfonic acid will be neutralized in the drilling fluid. The sulfonate, however, is a solid which is more convenient to handle and to disperse in the drilling fluid.

The extract oil is obtained as a product of a sequence of refining steps practiced on a mixed base crude oil such as a Mid-Continent crude oil.

In the preparation of lubricating oil stocks it is customary to use only virgin stocks which have been selected to provide highly paraffinic products. In order to increase the degree of paraffinicity the top crude is vacuum distilled, the heavier cuts therefrom are then propane fractionated and the fraction remaining after removal of SAE–50 lubestock is solvent extracted with a solvent such as phenol to produce a raffinate of extremely high paraffinicity and an extract oil which is more aromatic than the raffinate but which is not of sufficient aromaticity to be affected by mild sulfuric acid treatment such as is customarily applied to refinery crude oils or top crudes before being charged to the vacuum still. The residual material discarded from the propane fractionation step contains the rejected asphalt and more aromatic oils. This extract oil is quite consistent in its physical properties regardless of normal variations in the conditions of the various refining steps and has a refractive index of about 1.5472, a specific gravity at 60° F. of 0.996 and a viscosity-gravity constant of about 0.857.

The term "asphalt" or " asphaltic material" as used in this disclosure is meant to cover dark brown to black solid or semi-solid cementatious hydrocarbon material which is completely or substantially soluble in carbon disulfide, in which material bitumens are the sole or predominant constituent, these materials occurring in nature as such or being obtained by refining petroleum by distillation, precipitation, cracking, oxidation, or similar operations. Asphaltic materials useful in preparing the sulfonates of this invention representatively include asphaltenes, maltenes, blown asphalt, straight residual oils, distillation residues, still bottoms, cracking residues, asphaltic bitumens, and the like. The asphalt will usually be obtained in the step of deasphalting reduced crude stocks in the refining of petroleum.

In preparing the sulfonates of this invention the blend of asphaltic material and extract oil is dissolved in a suitable non-sulfonatable diluent such as carbon tetrachloride, chloroform, pentane, n-hexane, octanes, gasoline, kerosene, cyclohexane, diesel fuel and the like. A particularly suitable diluent in many cases, especially if the sulfonating agent is sulfur trioxide, is liquid sulfur dioxide. The diluent can be added to the blend of asphaltic material and extract oil before the sulfonation reaction and further amounts can be added after sulfonation if such is desired. The diluent can be separated from the sulfonation product by distillation, simple heating, or extraction with suitable solvents. In many cases the diluent need not be separated from the sulfonation product, especially if the sulfonate is to be used in preparing an oil-containing drilling fluid such as an oil and water emulsion base drilling fluid.

The blend of asphalt and extract oil can contain from about 5 to 95 weight percent asphalt and from about 95 to 5 weight percent extract oil; however, superior results are obtained when the blend contains about 25 to 75 weight percent asphalt and about 75 to 25 weight percent extract oil.

In the practice of this invention, oleum (20 percent fuming sulfuric acid) or anhydrous $SO_3$ are the preferred sulfonating agents although other sulfonating agents such as chlorosulfonic acid can be utilized. The sulfonation reaction can be conducted batchwise by adding the sulfonating agent dropwise to the blend of asphaltic material and extract oil in the diluent with agitation; or the sulfonation reaction can be conducted continuously by the simultaneous introduction of sulfonating agent and a blend of asphaltic material and extract oil in diluent to a suitable mixing device such as that disclosed in copending application Serial No. 116,583, filed June 12, 1961, by R. S. Logan. A particularly preferred sulfonating agent is $SO_3$ dissolved in liquid $SO_2$ in which case the blend of asphaltic material and extract oil can advantageously be diluted with liquid $SO_2$.

Sulfonation temperatures are usually controlled within the range of about 32 to about 140° F. although sulfonation of the extract oil and asphaltic material blend can be accomplished at temperatures in the broad range of about 0 to about 250° F. At temperatures above about 200° F. excessive oxidation with liberation of $SO_2$ often occurs and therefore the higher temperatures are usually avoided. At temperatures below about 32° F. the reaction time can be appreciable and for this reason the lower temperatures are usually avoided. The weight ratio of sulfonation agent to a blend of asphaltic material and extract oil in terms of $SO_3$ will usually be in the range of about 0.1:1 to 1:1. A particularly preferred ratio is in the range of about 0.25:1 to 0.85:1 because of economy and excellence of product in that range. In batchwise operations normal hexane is a preferred diluent for the extract oil and asphaltic material blend because of its lower vapor pressure at the sulfonation conditions. When operating in the preferred temperature range no reaction time over that required for contact is required.

The reaction mixture, comprising sulfonic acids and diluent, can be neutralized directly by adding thereto a basic compound such as ammonium hydroxide or carbonate, an alkali metal or an alkaline earth metal compound such as sodium hydroxide, calcium hydroxide, or barium hydroxide, or the corresponding metal carbonates. Any metal sulfonate of the blend of asphaltic material and extract oil can be used as a drilling mud additive; however, the alkali metal and ammonium sulfonates are preferred because of their excellent properties of dispersion in aqueous and oil-containing drilling fluids. Other metals which can be employed in certain situations and for particular purposes include lithium, potassium, magnesium, and strontium in the form of the hydroxide, oxide or carbonate.

After the neutralization step the sulfonate can be allowed to settle and then can be separated by any conventional method such as decantation, filtration, centrifugation or evaporation, to remove therefrom the diluent. The recovered sulfonate can then be dried and ground to produce the drilling mud additive of the invention. The sulfonate obtained in the practice of this invention is a brown to black colored, brittle solid, apparently amorphous in nature, which is readily dispersable in oil or water.

The drilling fluids of this invention can be prepared by any conventional method. The amount of sulfonate, water, clay, and oil or other component employed is dependent upon several variables, such as the nature of the sulfonate itself, the density of the drilling fluid desired, the nature of the formation penetrated, and other factors which can be readily determined by those skilled in the art upon being acquainted with this invention. It has long been customary in rotary oil drilling operations to subject the drilling fluid to simple routine tests from time to time, and these tests are sufficient to indicate the relative amounts of sulfonate, water, clay, or oil or other ingredient to be employed. Generally the amount of sulfonate employed will be that sufficient to form a relatively thin, impervious filter cake on the wall of the well, and in an amount that will impart sufficient viscosity and gel strength properties to the drilling fluid in order that it may readily be pumped and circulated and also in an amount that will reduce the coefficient of friction between the metal drill pipe and the earthern well bore to a satisfactorily low level. In general, the amount of sulfonate added to the drilling fluid will be in the range from about 1 to about 20 pounds per barrel (42 U.S. gallons) of drilling fluid. For oil-in-water emulsion systems the amount of water will usually be in the range from about 99 to 60 percent by weight of the final emulsion and the amount of oil will usually be in the range of about 1 to 40 percent by weight of the final emulsion.

The oil component used in preparing the emulsion drilling fluids of this invention can be any hydrocarbon normally used for this purpose in the art, such as diesel fuel, crude oil, kerosene, gas oil, heavy fuel oil, various petroleum fractions, and the like.

Although the drilling fluids of this invention need only contain the water dispersal and oil-disperable sulfonated blend of asphalt and extract oil as the material necessary to obtain desirable rheological properties of the drilling fluid, it is within the scope of this invention to add clays or other finely divided inorganic solids. Other materials can also be included, such as materials commonly used for weighting purposes including finely divided limestone, barite, lead sulfide, oyster shell, and the like. For the emulsion systems any suitable conventional emulsifying agent, such as the alkali and alkaline earth metal salts of saponifiable oils including vegetable oils, wood oils, fish oils and the like, can be empolyed.

The following examples and discussions are illustrative of this invention, and specific details for preparing the sulfonates and drilling fluids of this invention included therein are merely illustrative of preferred embodiments thereof and are not to be construed as unduly limiting this invention. The asphalt used in the following examples was obtained as the residue from the propane fractionation of reduced crude oil.

EXAMPLE I

Eight drilling fluid systems of varying compositions were prepared in accordance with the compositions given in Table I below.

Table I

| Materials | Mud Systems | | | | | | | |
|---|---|---|---|---|---|---|---|---|
| | 1001 | 1002 | 1003 | 1004 | 1005 | 1006 | 1007 | 1008 |
| Sample, gms | 5 | 10 | 20 | 5 | 5 | 5 | 5 | 5 |
| $H_2O$, cc | 350 | 350 | 350 | 350 | 350 | 350 | 350 | 350 |
| McCracken Clay, gms.[1] | 37.2 | 37.2 | 37.2 | 37.3 | 37.2 | 37.2 | 37.2 | 37.2 |
| CMC, gms.[2] | | | | | 0.5 | 0.5 | | |
| Starch, gms | | | | | | | 3 | 3 |
| NaCl | | | | | | | Sat'd | Sat'd |
| $CaSO_4 \cdot 2H_2O$, gms | | | | | | | | 5 |
| #2 Diesel Oil, cc | | | | 15 | | 15 | | |

[1] A low yield clay.
[2] Carboxymethyl cellulose.

A series of sulfonates of blends of asphalt and extract oil was prepared according to conditions shown in Table II.

Each of the drilling fluid systems was checked for water loss, using the API Code 29 Fluid Loss Test for comparison. The results of the tests, as well as a summary of the pertinent data relating to the preparation of the feed stocks, are reported in Table II.

Table II
PREPARATION AND WATER LOSS CONTROL PROPERTIES OF MUD ADDITIVES

| Sample No. | Feed Stock | | Feed Stock, gms. | $SO_3$, cc. | Solvent (n-hexane), cc. | Pot Temp., °F. | NaOH Soln., cc. | pH 1% Soln. | Water Loss in cc. in Mud # | | | | | | | |
|---|---|---|---|---|---|---|---|---|---|---|---|---|---|---|---|---|
| | Percent Asphalt | Percent Ext. Oil | | | | | | | 1001 | 1002 | 1003 | 1004 | 1005 | 1006 | 1007 | 1008 |
| 119 | 100 | 0 | 300 | 100 | 1,000 | 85-88 | 220 | 3.5 | 41.0 | 26.0 | 15.7 | 16.8 | 12.2 | 7.2 | | |
| 120 | 95 | 5 | 300 | 100 | 1,000 | 85-90 | 245 | 7.3 | 37.7 | 22.4 | 14.0 | 15.4 | 13.0 | 8.2 | | |
| 121 | 90 | 10 | 300 | 100 | 1,000 | 85-88 | 250 | 10.0 | 35.2 | 20.0 | 11.2 | 14.2 | 12.7 | 8.7 | | |
| 122 | 75 | 25 | 300 | 100 | 1,000 | 85-88 | 260 | 7.6 | 35.5 | 19.4 | 8.6 | 13.2 | 12.0 | 4.8 | | |
| 123 | 66.7 | 33.3 | 300 | 100 | 1,000 | 91 | 240 | 6.1 | 36.4 | 17.9 | 6.8 | 10.4 | 10.8 | 5.9 | 14.7 | 19.8 |
| 124 | 50 | 50 | 300 | 100 | 1,000 | 90 | 250 | 7.9 | 31.1 | 14.5 | 5.4 | 8.6 | 12.0 | 7.2 | 17.0 | 21.4 |
| 125 | 33.3 | 66.7 | 300 | 100 | 1,000 | 90 | 250 | 7.8 | 13.9 | 7.6 | 4.4 | 7.0 | 8.8 | 7.5 | 17.5 | 24.0 |
| 126 | 25 | 75 | 300 | 100 | 1,000 | 88-90 | 260 | 7.4 | 11.3 | 5.8 | 3.8 | 6.5 | 9.2 | 7.6 | 17.5 | 15.0 |
| 127 | 10 | 90 | 150 | 50 | 1,000 | 90-92 | 126 | 7.4 | 8.5 | 5.4 | 3.8 | 7.0 | 9.6 | 7.0 | 17.4 | 20.4 |
| 129 | 0 | 100 | 150 | 50 | 1,000 | 93 | 130 | 7.8 | 7.9 | 5.5 | 3.4 | 7.5 | 8.8 | 9.0 | 15.4 | 21.8 |
| 130 | 25 | 75 | 300 | 80 | 1,000 | 92-95 | 180 | 6.75 | 15.5 | 9.9 | 5.1 | 9.8 | 10.5 | 9.0 | 15.9 | 21.0 |
| 131 | 25 | 75 | 300 | 120 | 1,000 | 93-95 | 290 | 8.0 | 13.1 | 6.0 | 3.6 | 8.0 | 9.0 | 8.5 | 15.0 | 19.0 |

Sulfonation was conducted in a stirred, stainless steel reactor. The feed stock was, in each case, dissolved in 1,000 parts by volume of normal hexane per 300 parts by weight of feed stock and liquid sulfur trioxide was added over a period of 20 minutes to the stirred solution of feed stock. After the addition of the sulfur trioxide a 5-minute retention time at reaction temperature was maintained in all runs. The mixture in the reactor was maintained at a temperature of about 77° F. by immersion in a stirred water bath. The mixture in the reactor at the end of the 5-minute retention time was neutralized with sodium hydroxide in aqueous solution to a pH of approximately 8. The product was dried in a drum drier, ground and mixed by being tumbled.

The results of the tests of Table II show that the sulfonated blends of asphalt and extract oil are beneficial in controlling water loss in drilling fluids and that the materials are compatible with additives usually used in drilling fluids such as carboxymethyl cellulose, starch and diesel oil. The results also show that the performance of the material is not unduly adversely affected by contaminants such as sodium chloride and calcium sulfate.

EXAMPLE II

Samples of the asphalt of Example I and samples of the extract oil of Example I were separately sulfonated according to the procedure described with respect to the samples of Example I and were tested in a Muddle 35 Fann V-G Meter according to the procedure described in API Recommended Practices, May 1957. The results of the test are set forth in Table III.

Table III

| Percent Asphalt | 100 | 90 | 75 | 66.6 | 50 | 33.3 | 25 | 0 | Base Mud |
|---|---|---|---|---|---|---|---|---|---|
| Percent Extract Oil | 0 | 10 | 25 | 33.3 | 50 | 66.6 | 75 | 100 | |
| 6 lb./bbl. of Base Mud Sulfonated Blends: | | | | | | | | | |
| Apparent Viscosity | | 31.0 | 35.0 | 38.5 | 29.5 | 31.0 | 40.0 | | 22 |
| Plastic Viscosity | | 26 | 31 | 32 | 25 | 26 | 33 | | 19 |
| Yield Point | | 10 | 8 | 13 | 9 | 10 | 14 | | 6 |
| Zero Gel | | 4 | 5 | 5 | 2 | 4 | 2 | | 2 |
| 10 Minute Gel | | 20 | 25 | 28 | 13 | 15 | 12 | | 5 |
| API Fluid Loss | | 5.0 | 5.2 | 5.0 | 5.1 | 4.8 | 4.6 | | 9 |
| Blended Sulfonates: | | | | | | | | | |
| Apparent Viscosity | 46.5 | 50.5 | 50.0 | 40.5 | 42.5 | 40.5 | 40.0 | 33.5 | |
| Plastic Viscosity | 39 | 43 | 44 | 36 | 34 | 35 | 35 | 27 | |
| Yield Point | 15 | 15 | 12 | 9 | 17 | 11 | 10 | 13 | |
| Zero Gel | 6 | 7 | 6 | 4 | 3 | 4 | 3 | 4 | |
| 10 Minute Gel | 36 | 34 | 30 | 24 | 13 | 11 | 12 | 5 | |
| API Fluid Loss | 6.6 | 6.4 | 6.2 | 5.4 | 5.0 | 5.2 | 5.6 | 7.6 | |

EXAMPLE III

Additional tests designed to demonstrate water loss properties and properties of inhibitation of bentonite swelling were conducted and the results of these tests are show in Table IV.

*Table IV*

| Material | Percent Asphalt[e] | Plastic Visc./Yield Point[a] | Initial Water Loss[b] | 5% D.O. Added[c] | pH 1% Solution |
|---|---|---|---|---|---|
| Base Mud | | 52/49 | 26 | 22 | |
| 119 [d] | 100 | 25/8 | 14 | 12.5 | 4.3 |
| 120 | 95 | 32/2 | 11.2 | 13.8 | 7.0 |
| 121 | 90 | 33/6 | 12.4 | 12.6 | 7.5 |
| 122 | 75 | 29/11 | 10.2 | 12.5 | 6.9 |
| 123 | 66⅔ | 15/25 | 9.8 | 10 | 6.4 |
| 124 | 50 | 27/16 | 9.5 | 12 | 7.8 |
| 125 | 33⅓ | 22/16 | 9.0 | 13.4 | 7.8 |
| 126 | 25 | 26/10 | 7.7 | 12.8 | 8.0 |
| 127 | 10 | 17/8 | 13.0 | 12.0 | 7.4 |

[a] Inhibition mud used (10 lbs. additive/bbl. added).
[b] Water loss mud used (6 lbs. additive/bbl. added).
[c] Diesel Oil (5%) added to water loss base mud.
[d] All sample numbers preceded by FB-9040 with a series 66/74 inclusive also included.
[e] Percent asphalt in the blend before sulfonation.

The above results show that sulfonated blends of asphalt and extract oil exhibit particularly desirable properties of inhibition and water loss in ranges of 25 to 75 percent asphalt in the blend of feed for sulfonation.

EXAMPLE IV

In this example the ability of the additives of this invention to enhance the lubricating properties of drilling fluids is demonstrated. Water based drilling fluids containing 12.5 weight percent McCracken clay were prepared and tested. The lubricity, or, conversely, the coefficient of friction of such drilling fluids was determined in a Shell 4-Ball Extreme Pressure Lubricant Tester, made by the Precision Scientific Company using three glass balls with one steel ball rotating against them. The coefficient of friction measured for these drilling fluids at the various indicated pressures according to the technique are set forth in Table V.

*Table V*

SHELL FOUR BALL TESTS, USING 3 GLASS BALLS AND 1 STEEL BALL

| | Coefficient of Friction ($\mu$) at Pressure (P) in Kilograms | | | | | | |
|---|---|---|---|---|---|---|---|
| | 6 | 12 | 18 | 24 | 30 | 36 | 42 |
| 12½% McCracken Clay (Base Mud) | 0.40 | 0.57 | 0.57 | | | | |
| Base Mud+4 lb./bbl. Sulfonated Asphalt | | 0.033 | 0.096 | 0.151 | 0.191 | 0.237 | |
| Base Mud+4 lb./bbl. Sulfonated Extract Oil | | | 0.009 | 0.040 | 0.072 | 0.066 | 0.107 |
| Base Mud+4 lb./bbl. Sulfonated Blend (33.3% Asphalt, 66.6% Extract Oil) | | | 0.010 | 0.048 | 0.052 | 0.040 | 0.042 |

The above results show that sulfonated blends of asphalt and extract oil are superior to either the sulfonated extract oil or the sulfonated asphalt in reducing the coefficient of friction of the drilling fluids containing the additives.

The Shell 4-Ball Tester is essentially a means for rotating one ½-inch ball bearing against three others which are held in rigid position with reference to a sample cup containing the lubricant (as well as the three ball bearings). There is a lever and thrust bearing arrangement for varying the force with which the three balls are pushed up against the rotating ball. Also, there is a torque measuring device attached to the cup assembly. Three Pyrex glass balls were used below and one steel ball was rotated against them. It was found that this avoided breakage of the glass balls and loads up to 36 kilograms could be applied. This permitted the measurement of a wide range of coefficient of friction, from 0.002 to 1.00 (or more).

Torque is registered on a chart which is wrapped around a drum travelling at one r.p.m. In making a measurement, a base line is drawn with the chart drive operating but with the spindle motor not operating. Then the sample cup is given a thrust load of 6 kilograms and a run of 1 minute is made with the spindle and chart drive both operating. The machine is temporarily shut off and the thrust is raised to 12 kilograms for another 1-minute run. Likewise, runs are made at 18, 24, 30 and 36 kilograms.

The distance (in millimeters) between the base line and the curve (at a given loading) is measured at 5-second intervals and averaged. Then, $$\text{Coefficient of friction} = 0.3365\ U/P$$

where $U$=displacement of pen in millimeters and
$P$=thrust loading in kilograms.

The above formula presupposes that spring 3 (the most sensitive furnished with the instrument) is used in the torque measuring device.

Advantages of the 4-ball method are small size of sample and speed. About 15 milliliters of sample are required. In addition to 7 minutes' running time, about 25 minutes of cleanup and assembly are required.

That which is claimed is:

1. In a process of drilling a well with well drilling tools, the step of circulating in said well a drilling liquid medium selected from the group consisting of oil, water, and oil and water emulsions containing, in an amount sufficient to reduce the filtration rate of said drilling liquid medium, a salt selected from the group consisting of alkali metal salts, alkaline earth metal salts, and ammonium salts of a sulfonated blend of about 25 to 75 weight percent asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock.

2. The process of claim 1 wherein the salt of the sulfonated blend is an alkali metal salt.

3. The process of claim 1 wherein the salt of the sulfonated blend is an alkaline earth metal salt.

4. The process of claim 1 wherein the salt of the sulfonated blend is an ammonium salt.

5. A well-working fluid comprising a liquid medium selected from the group consisting of oil, water, and oil and water emulsions and a salt selected from the group consisting of alkali metal salts, alkaline earth metal salts, and ammonium salts of a sulfonated blend of about 25 to 75 weight percent asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock, said salt being dispersed in said liquid medium in an amount sufficient to reduce the filtration loss of said well-working fluid.

6. The well-working fluid of claim 5 wherein the salt is present in an amount of about 1 to about 20 pounds per barrel of well-working fluid.

7. An aqueous base drilling fluid comprising water and a salt selected from the group consisting of alkali metal salts, alkaline earth metal salts, and ammonium salts of a sulfonated blend of about 25 to 75 weight percent asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock, said salt being dispersed in the water in an amount sufficient to reduce the filtration loss of said drilling fluid.

8. An oil-containing drilling fluid comprising an oil-containing liquid medium selected from the group consisting of alkali metal salts, alkaline earth metal salts, and ammonium salts and a salt selected from the group consisting of alkali metal salts, alkaline earth metal salts, and ammonium salts of a sulfonated blend of about 25 to 75 weight percent asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock, said salt being dispersed in said liquid medium in an amount sufficient to reduce the filtration loss of said oil-containing drilling fluid.

9. The drilling fluid of claim 8 wherein the liquid medium is oil.

10. The drilling fluid of claim 8 wherein the liquid medium is an emulsion of water and oil.

11. A process for preparing an additive for a well-working fluid which comprises sulfonating a blend of about 25 to 75 weight percent asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock; neutralizing the sulfonic acids produced with a basic compound to form a salt selected from the group consisting of alkali metal salts, alkaline earth metal salts, and ammonium salts; and recovering the salt of the sulfonated blend as the additive.

12. A well-working fluid additive comprising a salt selected from the group consisting of alkali metal salts, alkaline earth metal salts, and ammonium salts of a sulfonated blend of about 25 to 75 weight percent of asphalt and about 75 to 25 weight percent of the extract oil from the solvent extraction of a deasphalted, dewaxed oil remaining after removal of SAE–50 and lighter lubestock in the propane fractionation of a Mid-Continent lube oil stock.

References Cited by the Examiner
UNITED STATES PATENTS

| | | | |
|---|---|---|---|
| 2,331,049 | 10/43 | Schindler | 252—8.5 |
| 2,568,992 | 9/51 | Doscher | 252—8.5 |
| 2,848,415 | 8/58 | Logan | 252—33 |
| 2,884,445 | 4/59 | Axe et al. | 252—33 |
| 2,953,525 | 9/60 | Young | 252—8.5 |
| 3,028,333 | 4/62 | Stratton et al. | 252—8.5 |
| 3,099,624 | 7/63 | Wilson | 252—8.5 |
| 3,105,046 | 9/63 | Fischer | 252—8.5 |
| 3,105,047 | 9/63 | Miller et al. | 252—8.5 |
| 3,135,693 | 6/64 | Whitney et al. | 252—33 |

JULIUS GREENWALD, *Primary Examiner.*

ALBERT T. MEYERS, *Examiner.*